(12) United States Patent
Ewehag et al.

(10) Patent No.: US 11,820,257 B2
(45) Date of Patent: Nov. 21, 2023

(54) VEHICLE SEAT ARRANGEMENT

(71) Applicant: Ningbo Geely Automobile Research & Development Co., Ltd., Ningbo (CN)

(72) Inventors: Oskar Ewehag, Gothenburg (SE); Johan Höcks, Varberg (SE); Christian Forsberg, Laholm (SE)

(73) Assignee: NINGBO GEELY AUTOMOBILE RESEARCH & DEVELOPMENT CO., Ningbo (CN)

( * ) Notice: Subject to any disclaimer, the term of this patent is extended or adjusted under 35 U.S.C. 154(b) by 26 days.

(21) Appl. No.: 17/555,406

(22) Filed: Dec. 18, 2021

(65) Prior Publication Data
US 2022/0111769 A1  Apr. 14, 2022

Related U.S. Application Data

(63) Continuation of application No. PCT/CN2020/103028, filed on Jul. 20, 2020.

(30) Foreign Application Priority Data

Aug. 13, 2019  (EP) ..................................... 19191573

(51) Int. Cl.
*B60N 2/20* (2006.01)
*B60N 2/22* (2006.01)
(Continued)

(52) U.S. Cl.
CPC ........... *B60N 2/203* (2013.01); *B60N 2/2222* (2013.01); *B60N 2/3081* (2013.01); *B60N 2002/0216* (2013.01); *B60N 2205/30* (2013.01)

(58) Field of Classification Search
None
See application file for complete search history.

(56) References Cited

U.S. PATENT DOCUMENTS

| 9,583 A * | 2/1853 | Briggs ................... B60N 2/203 297/230.13 |
| 250,597 A | 12/1881 | St. John |

(Continued)

FOREIGN PATENT DOCUMENTS

| CN | 101309813 A | 11/2008 |
| CN | 101797897 A | 8/2010 |

(Continued)

OTHER PUBLICATIONS

International Search Report from corresponding International Application No. PCT/CN2020/103028, dated Oct. 21, 2020, 3 pages.

*Primary Examiner* — David E Allred
(74) *Attorney, Agent, or Firm* — TUCKER ELLIS LLP

(57) ABSTRACT

A vehicle seat arrangement includes a vehicle seat arranged to be adjusted between a forward facing setup and a rearward facing setup and a seat support structure. The vehicle seat has three seat parts, where a second seat part is pivotably connected to both a first seat part and a third seat part. The second seat part is pivotably connected to the seat support structure. In the forward facing setup, the first and second seat parts make up a seat back and the third seat part make up a seat cushion. In the rearward facing setup, the first seat part make up the seat cushion and the second and third seat parts make up the seat back of the vehicle seat.

14 Claims, 5 Drawing Sheets

(51) Int. Cl.
  B60N 2/30 (2006.01)
  B60N 2/02 (2006.01)

(56) References Cited

U.S. PATENT DOCUMENTS

| | | | |
|---|---|---|---|
| 2004/0256894 A1* | 12/2004 | McManus | B60N 2/2231 |
| | | | 297/93 |
| 2005/0057081 A1 | 3/2005 | Kahn et al. | |
| 2008/0224524 A1* | 9/2008 | Mather | B60N 2/015 |
| | | | 297/378.1 |
| 2009/0273215 A1* | 11/2009 | Barker | B60N 2/2821 |
| | | | 297/253 |
| 2014/0265499 A1* | 9/2014 | Pacolt | B60N 2/366 |
| | | | 297/337 |
| 2017/0341532 A1* | 11/2017 | Sowinski | B60N 2/3022 |
| 2020/0001744 A1* | 1/2020 | Franz | A47C 7/62 |

FOREIGN PATENT DOCUMENTS

| | | | | |
|---|---|---|---|---|
| CN | 201721350 U | | 1/2011 | |
| CN | 103625322 A | | 3/2014 | |
| CN | 107839707 A | | 3/2018 | |
| CN | 209225001 U | | 8/2019 | |
| EP | 1074468 A2 | | 2/2001 | |
| GB | 2513251 A | * | 10/2014 | ............ B60N 2/203 |
| JP | 2002336069 A | | 11/2002 | |
| JP | 2019199159 A | * | 11/2019 | |
| WO | 92/12024 A1 | | 7/1992 | |

\* cited by examiner

VEHICLE SEAT ARRANGEMENT

RELATED APPLICATION DATA

This application is a continuation of International Patent Application No. PCT/CN2020/103028, filed Jul. 20, 2020, which claims the benefit of European Patent Application No. 19191573.5, filed Aug. 13, 2019, the disclosures of which are incorporated herein by reference in their entireties.

TECHNICAL FIELD

The invention relates to a vehicle seat arrangement comprising a vehicle seat arranged to be adjusted between a forward facing setup and a rearward facing setup, and a seat support structure configured for being fastened to a vehicle structure. The vehicle seat comprises a first seat part, a second seat part and a third seat part. The second seat part is pivotably connected to both the first seat part and the third seat part and is positioned between the first seat part and the third seat part. The second seat part is further pivotably connected to the seat support structure. In the forward facing setup, the first seat part and the second seat part make up a seat back of the vehicle seat and the third seat part make up a seat cushion of the vehicle seat.

BACKGROUND

Large vehicles such as sport utility vehicles, minivans or multi-purpose vehicles may have a third row of seats as compared to smaller vehicles that normally have two rows of seats. In some instances it is useful to flip the second and/or the third row from a forward facing setup to a backward facing setup (and vice versa).

Many solutions on the market usually requires the user to disassemble the seat from a vehicle structure such as a vehicle floor, bring it out of the vehicle, rotate it manually and then assemble it to the seat structure in the vehicle floor again. This makes changing the seat setup difficult and time consuming and may require the use of tools.

WO 92/12024 A1 discloses a passenger seat for a vehicle comprising a two-part seat back where a lower part of the seat back is deployably supported relative to an upper part. This enables the seat to be used as a child seat when the lower part of the seat back is deployed. When deployed, the child seat may take on a forward facing setup and a rearward facing setup. Even though WO 92/12024 A1 discloses a way to change the seat facing setup inside the vehicle, disadvantages still exist.

SUMMARY

An objective of the disclosure is to provide an improved vehicle seat arrangement. The objective is achieved by a vehicle seat arrangement arranged to be adjusted between a forward facing setup and a rearward facing setup, and a seat support structure configured for being fastened to a vehicle structure. The vehicle seat comprises a first seat part, a second seat part and a third seat part. The second seat part is pivotably connected to both the first seat part and the third seat part and is positioned between the first seat part and the third seat part. The second seat part is further pivotably connected to the seat support structure. In the forward facing setup, the first seat part and the second seat part make up a seat back of the vehicle seat and the third seat part make up a seat cushion of the vehicle seat. The second seat part is arranged to pivot between the forward facing setup and the rearward facing setup, wherein in the rearward facing setup, the first seat part make up the seat cushion and the second seat part and third seat part make up the seat back of the vehicle seat.

Existing solutions where a seat back is adjusted from a forward facing setup to a rearward facing setup usually compromises seating comfort. It can also be complicated for a user to change the seat facing setup of a vehicle seat. The complete vehicle seat may have to be disassembled, removed from the vehicle and reassembled to obtain the new facing setup. In WO 92/12024 A1, it is only possible to adjust the facing setup of the seat when it is used as a child seat. The facing setup of the seat of WO 92/12024 A1 cannot be adjusted for an adult user.

In order to experience a comfortable ride in a vehicle, lumbar support is highly prioritized. The vehicle seat according to the disclosure is divided into three parts, a first seat part, a second seat part and a third seat part. The second, or middle, seat part makes up the lumbar support and is arranged to pivot between the forward facing setup and the rearward facing setup. The first and second seat parts alternate between functioning as seat back and seat cushion depending on the vehicle seat facing setup. This makes the vehicle seat according to the disclosure easy to adjust between the forward facing setup and the rearward facing setup, wherein in the rearward facing setup while providing a comfortable experience for a user.

The seat support structure may be arranged to be displaced horizontally on an adjusting structure in the vehicle structure between a forward seat support structure location and a rearward seat support structure location.

In order to easier adjust the vehicle seat between the forward facing setup and the rearward facing setup, wherein in the rearward facing setup, the seat support structure may be arranged to be displaced horizontally on an adjusting structure in the vehicle structure. This makes it possible to have proper leg space in both the forward facing setup and the rearward facing setup.

The vehicle seat arrangement may further comprise a load bearing structure configured for being fastened to the vehicle structure and arranged to assist in bearing the load from a seated occupant in both the forward facing setup and the rearward facing setup.

By providing the vehicle seat with a load bearing structure fastened to the vehicle structure, at least part of the load from a seated occupant both in the forward facing position and the backward facing can be borne by the load bearing structure. The load bearing structure is arranged in the vehicle such that it is positioned underneath the second seat part and has a height such that the second seat part can rest on the load bearing structure when in the forward facing setup or in the rearward facing setup. By using a load bearing structure, the load on the seat support structure is reduced and any attachment between the second seat part and the seat support structure and/or the seat support structure itself can be made less sturdy. This simplifies the design of the vehicle seat and reduces the material cost for the vehicle seat.

The second seat part may be symmetric.

In order to provide a comfortable experience in both the forward facing setup and the rearward facing setup, the second seat part can be made symmetric such that the user experience does not change depending on the forward facing setup and the rearward facing setup.

The second seat part may comprise a raised second seat portion arranged to provide lumbar support.

In order to improve the lumbar support of the second seat part, it can be made to better conform to the human body by providing the second seat part with a raised second seat portion.

The first and third seat parts may be identical.

In order to provide a comfortable experience in both the forward facing setup and the rearward facing setup, the first and third seat parts can be made identical such that the user experience does not change depending on the forward facing setup and the rearward facing setup.

The first and third seat parts may comprise raised first and third seat portions and depressed first and third seat portions arranged to provide cervical and thoracic support.

To further improve the comfort of the vehicle seat, support towards the upper part of the back, close to the neck, can be achieved by designing the first and third seat parts to better conform to the human body. This may include raised first and third seat portions and depressed first and third seat portions.

The vehicle seat may be arranged in the first row of a vehicle. The vehicle seat may be arranged in the second row of a vehicle. The vehicle seat may be arranged in the third row of a vehicle.

The vehicle seat of the vehicle seat arrangement can be arranged at any location in a vehicle. Depending on which row the vehicle seat is installed, constraints on which of the two variations described above that can be used may exist. It is also conceivable that the vehicle seat arrangement can be used in even larger vehicles, such as buses, airplanes, helicopters, trains, ships, boats etc.

The invention further relates to a vehicle comprising a vehicle seat according to any one of the preceding claims.

DETAILED DESCRIPTION

Figure 1A:
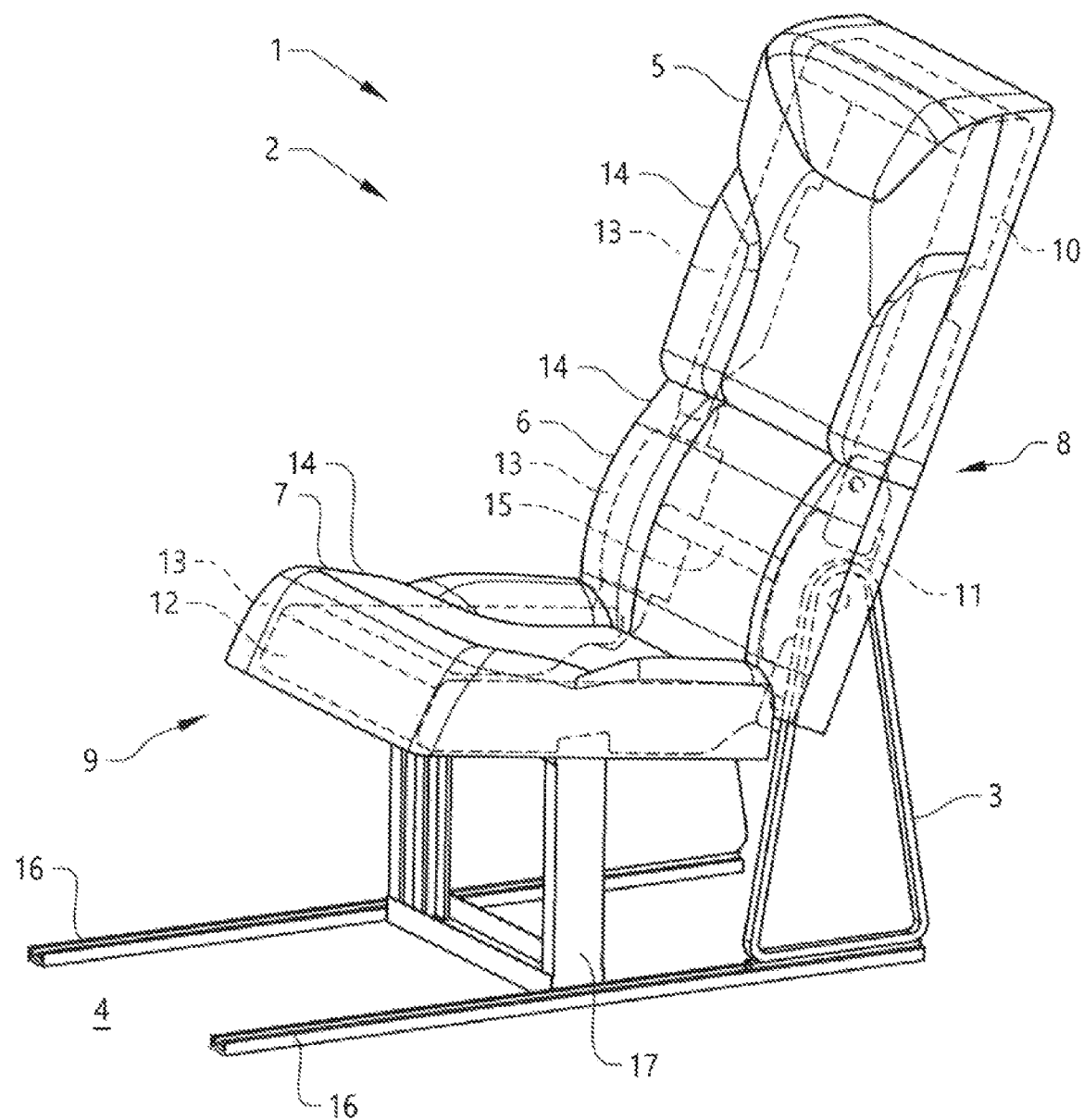
FIGS. 1A-1B schematically show a perspective view of a vehicle seat arrangement according to a first and a second example embodiment of the disclosure, FIGS. 2A-2F schematically show a vehicle seat arrangement according to the first example embodiment being adjusted between a forward facing setup and a rearward facing setup.

FIG. 1A schematically shows a perspective view of a vehicle seat arrangement 1 according to a first example embodiment of the disclosure.

The vehicle seat arrangement 1 comprises a vehicle seat 2 arranged to be adjusted between a forward facing setup and a rearward facing setup and a seat support structure 3 configured for being fastened to an vehicle structure 4. The vehicle structure 4 can for instance be a vehicle floor or a raised part of the vehicle interior. The vehicle seat 2 comprises a first seat part 5, a second seat part 6 and a third seat part 7. The second seat part 6 is pivotably connected to both the first seat part 5 and the third seat part 7 and is positioned between the first seat part 5 and the third seat part 7. The second seat part 6 is further pivotably connected to the seat support structure 3. In the forward facing setup, the first seat part 5 and the second seat part 6 make up a seat back 8 of the vehicle seat 2 and the third seat part 7 make up a seat cushion 9 of the vehicle seat 2.

The second seat part 6 is arranged to pivot between the forward facing setup and the rearward facing setup, wherein in the rearward facing setup, the first seat part 5 make up the seat cushion 9 and the second seat part 6 and third seat part 7 make up the seat back 8 of the vehicle seat 2. The vehicle seat 2 is arranged to be adjusted between a forward facing setup and a rearward facing setup. With forward facing setup is meant that a user sitting in the vehicle seat 2 faces a forward direction towards the front of the vehicle or the vehicle's direction of travel. With rearward facing setup is meant that a user sitting in the vehicle seat 2 faces a rearward direction towards the rear of the vehicle or in a direction opposite of the vehicle's direction of travel.

Each of the first seat part 5, the second seat part 6 and the third seat part 7 comprises a respective first seat part frame structure 10, second seat part frame structure 11 and third seat part frame structure 12 covered with seat foam 13 that in turn is clad with a seat cover 14. The first seat part frame structure 10, second seat part frame structure 11 and third seat part frame structure 12 and/or seat foam 13 are adapted to give each of the first seat part 5, the second seat part 6 and the third seat part 7 a desired shape. The second seat part frame structure 11 comprises a pivoting axle 15 arranged to be pivotably attached to the seat support structure 3. Electronic controls and actuators can be installed to assist with the adjustment of the vehicle seat 2. The vehicle seat 2 may also be fitted with seat belts or other safety equipment depending on national or regional regulations. The manufacturing of the various parts of the vehicle seat 2 is well known in the art.

The seat support structure 3 is arranged to be movably attached to the vehicle structure 4, for instance on an adjusting structure 16 similar to seat adjusters found in today's vehicles, between a forward seat support structure position and a rearward seat support structure position. The seat support structure 3 and thereby the vehicle seat 2 is locked in place in the forward seat support structure position and the rearward seat support structure position. A lock used to lock the seat support structure in place can be any suitable lock known in the art that fulfills safety regulations. The adjusting structure 16 can be a metal or plastic profile that allows the seat support structure 3 to be displaced horizontally between a forward seat support structure location and a rearward seat support structure location.

In FIG. 1A, the vehicle seat arrangement 1 further comprises a load bearing structure 17 that is arranged to assist in bearing the load of a user sitting in the vehicle seat 2. The load bearing structure 17 is arranged to be fixed in place in the vehicle structure 4.

Figure 1B:
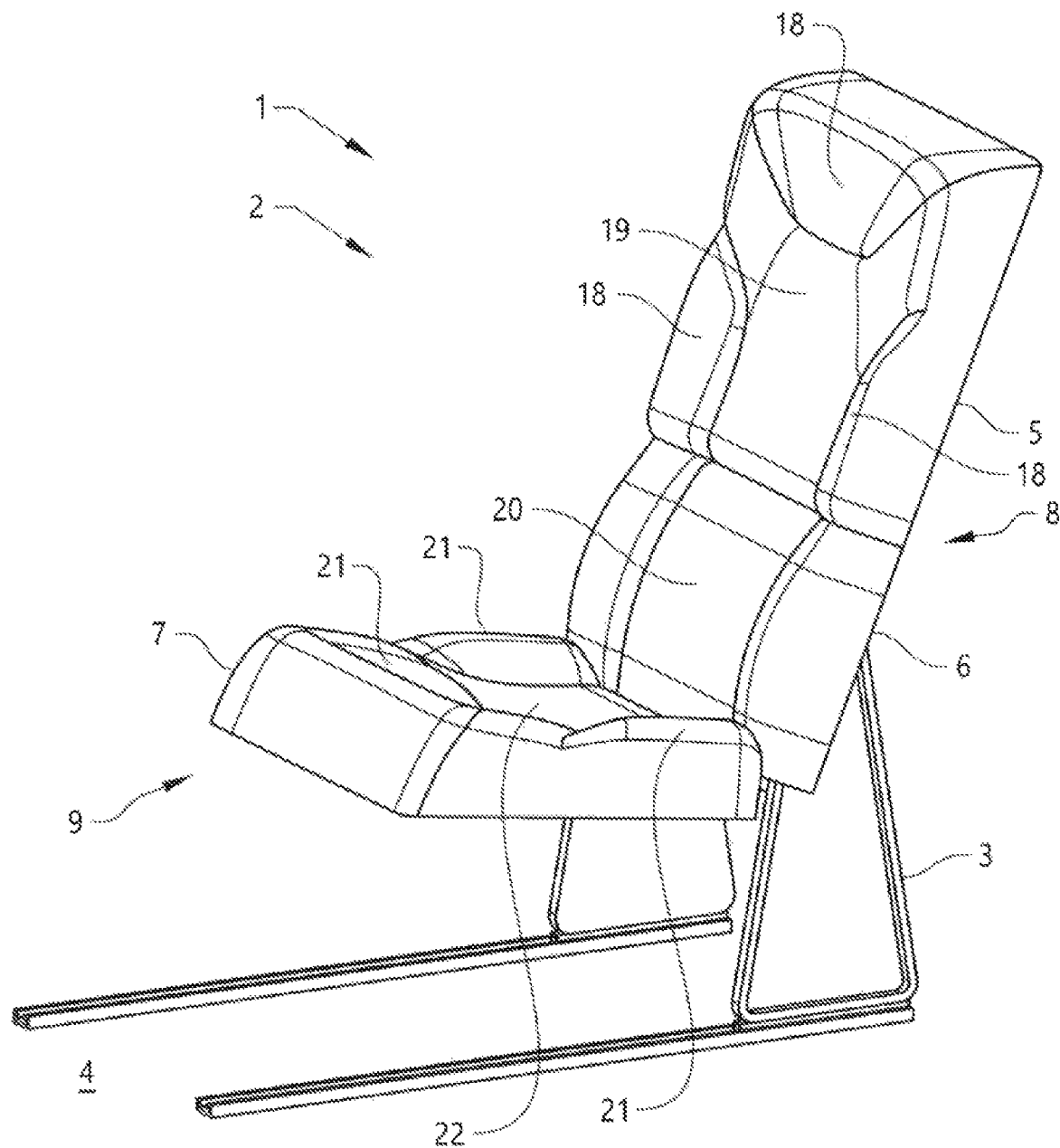

FIG. 1B schematically shows a perspective view of a vehicle seat arrangement 1 according to a second example embodiment of the disclosure. In FIG. 1B, no load bearing structure 17 is used. This means that the seat support structure 3 will bear the entire load from a user sitting the vehicle seat 2.

In FIG. 1B, it can more clearly be seen that the first seat part 5 comprises a raised first seat portion 18 and a depressed first seat portion 19, that the second seat part 6 comprises a raised second seat portion 20 and that the third seat part 7 comprises a raised third seat portion 21 and a depressed third seat portion 22. The raised first seat portion 18, depressed first seat portion 19, raised third seat portion 21 and the depressed third seat portion 22 are arranged to provide cervical and thoracic support to a user of the vehicle seat 2 when the first and third seat parts are in an upright state. It is possible to design the seat portions 18, 19, 21, 22 to provide leg and buttocks support when the first and third seat parts 5, 7 are in the seated state. The raised second seat portion 20 is arranged to provide lumbar support. The design of these portions may vary and are known in the art.

The vehicle seat 2 may comprise a headrest (not shown) arranged to be removably attached to either the first seat part 5 or the third seat part 7 depending on the facing setup of the vehicle seat 2.

In the figures, the second seat part 6 is symmetric in order to provide equal comfort in both the forward facing setup and the rearward facing setup. This is not necessary and the second seat part can be arranged to provide more comfort in the facing setup that is most often used. Further, the first and third seat parts 5, 7 are in the figures identical. This is not necessary and the first seat part 5 or the third seat part 7 can be arranged to provide more comfort in the facing setup that is most often used.

FIGS. 2A-2F schematically show a vehicle seat arrangement 1 according to the first example embodiment being adjusted between a forward facing setup and a rearward facing setup.

Figure 2A:
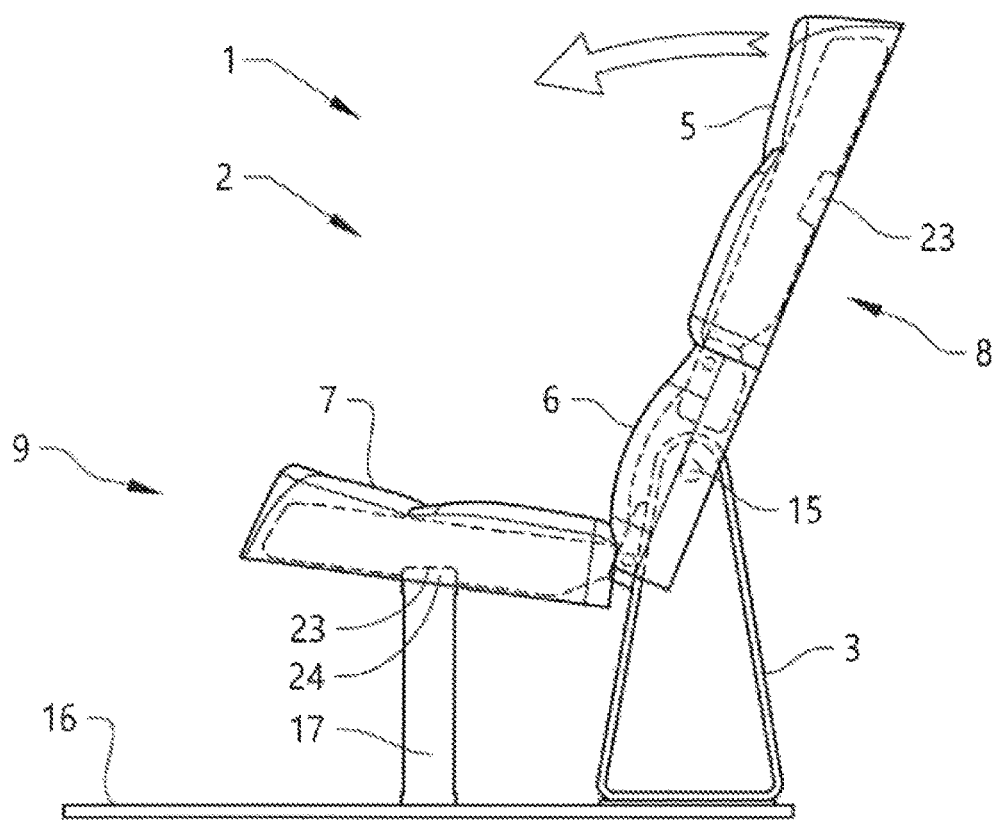

In FIG. 2A, the vehicle seat arrangement 1 is in the forward facing setup, i.e. the vehicle's direction of travel is to the left in FIG. 2A. The seat support structure 3 is in its forward seat support structure location. The first seat part 5 and the second seat part 6 make up the seat back 8 of the vehicle seat 2 and the third seat part 7 make up the seat cushion 9 of the vehicle seat 2. In the forward facing setup, the first seat part 5 is in the upright state and the third seat part 7 is in a seating state.

The load bearing structure 17 is arranged to engage with a cavity 23 in the third seat part frame structure 12 wherein the cavity 23 has a shape that matches an upper part 24 of the load bearing structure 17. A corresponding cavity 23 can be seen also in the first seat part frame structure 10.

As a first step, the first seat part 5 will pivot forwardly relative the second seat part 6 as indicated by the arrow.

Figure 2B:
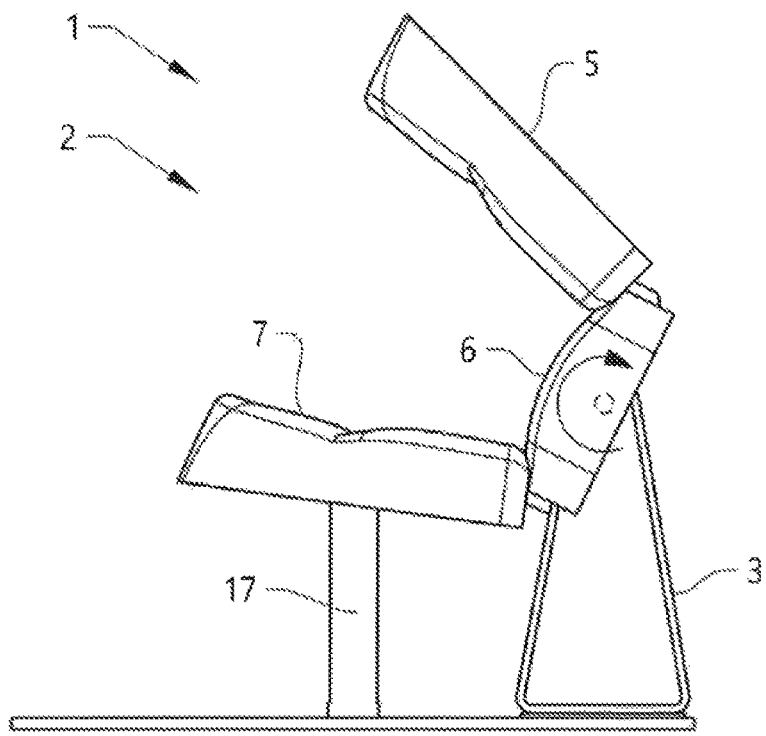

In FIG. 2B, the first seat part 5 has pivoted forwardly relative the second seat part 6 in order to prepare for the transition between the forward facing setup and the rearward facing setup. The first seat part 5 is now in a transition state.

As a second step, the second seat part 6 will pivot relative the seat support structure 3 as indicated by the arrow.

Figure 2C:
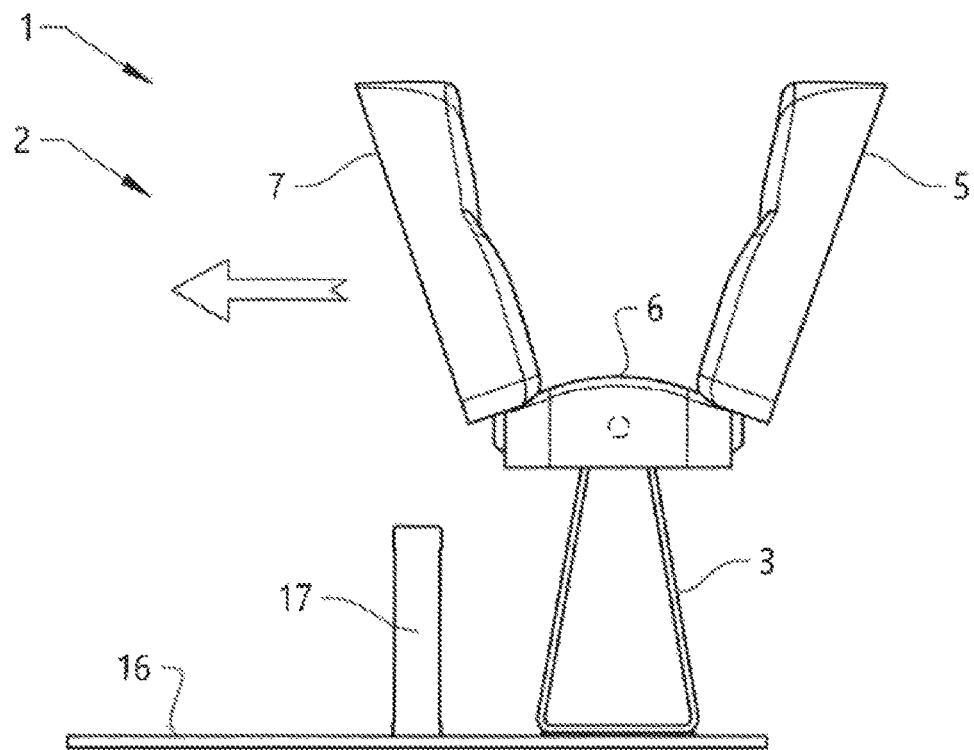

In FIG. 2C, the second seat part 6 has pivoted relative the seat support structure 3 so that the load bearing structure 17 no longer engages with the cavity of the third seat part frame structure 12. The seat support structure 3, and thereby the vehicle seat 2, is prepared to be displaced horizontally along the adjusting structure 16 from the first seat support structure location.

As a third step, the seat support structure 3 will be displaced horizontally along the adjusting structure 16 to the rearward seat support structure location as indicated by the arrow.

Figure 2D:
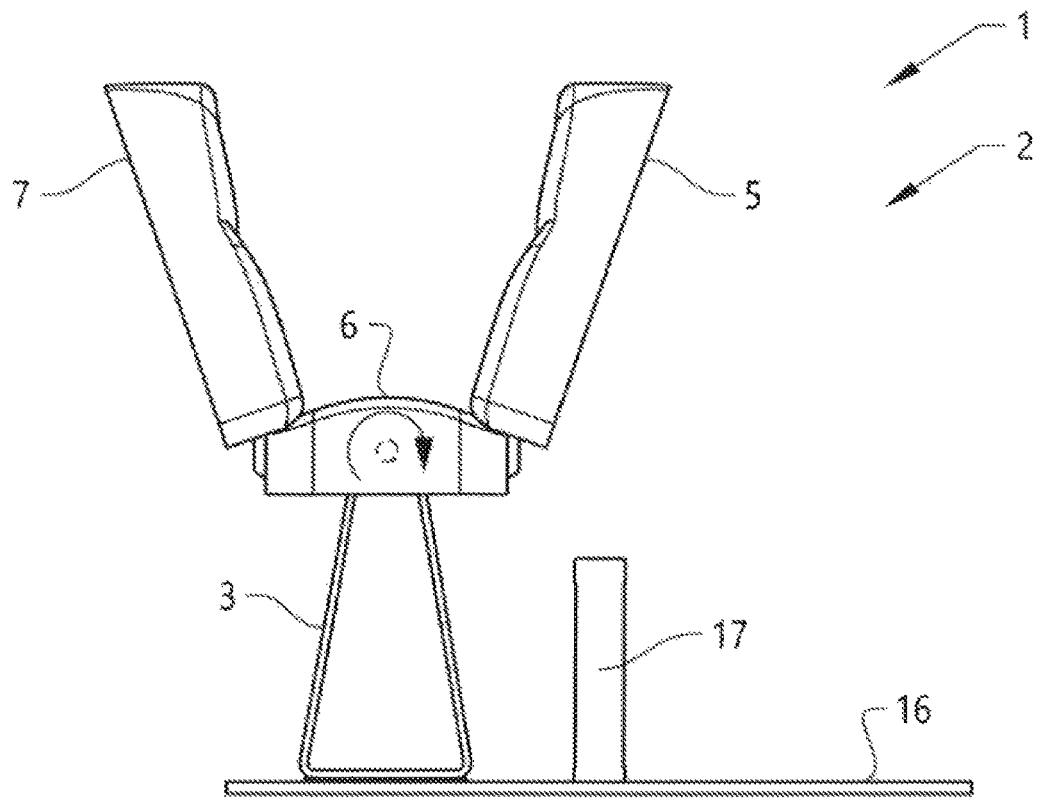

In FIG. 2D, the seat support structure 3 has been displaced horizontally along the adjusting structure 16 to the rearward seat support structure location.

As a fourth step, the second seat part 6 will pivot relative the seat support structure 3 as indicated by the arrow.

Figure 2E:
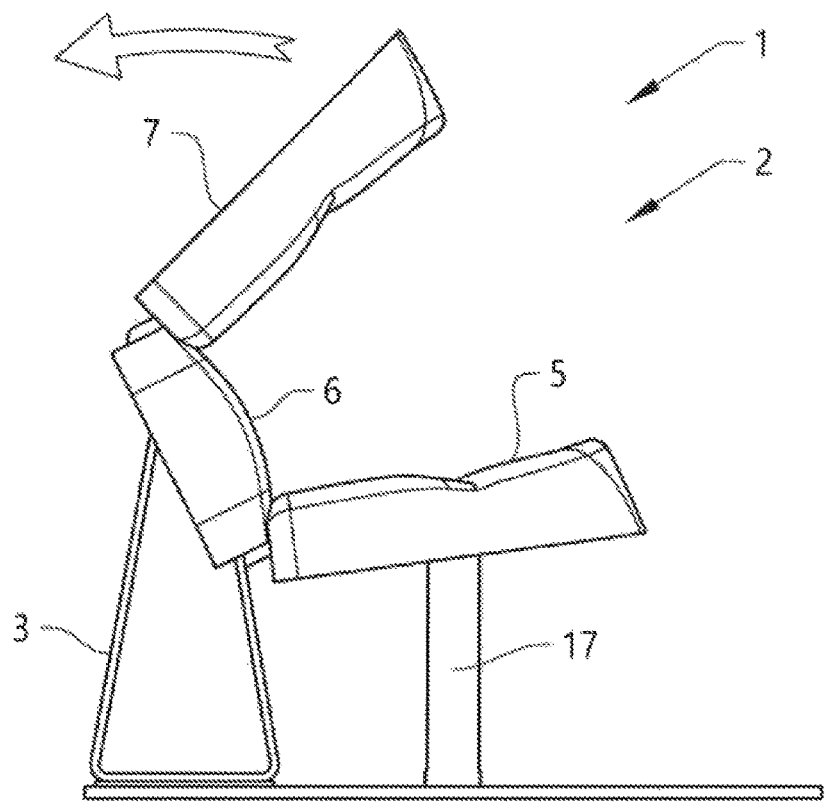

In FIG. 2E, the second seat part 6 has pivoted relative the seat support structure 3 and the first seat part 5 now rests on the load bearing structure 17 where the upper part 24 of the load bearing structure 17 has engaged with the cavity 23 of the first seat part frame structure 10.

Both in the forward seat support structure location and in the rearward seat support structure location, the third seat part 7 and the first seat part 5 respectively, is in a position such that the upper part 24 of the load bearing structure 17 engages with the cavity 17 when the second seat part 6 pivots in place without essentially any adjustments being required in the horizontal position of the seat support structure 3. This leads to that it is easy to adjust the vehicle seat between the forward facing setup and the rearward facing setup.

As a fifth step, the third seat part 7 has pivoted relative the second seat part 6.

Figure 2F:
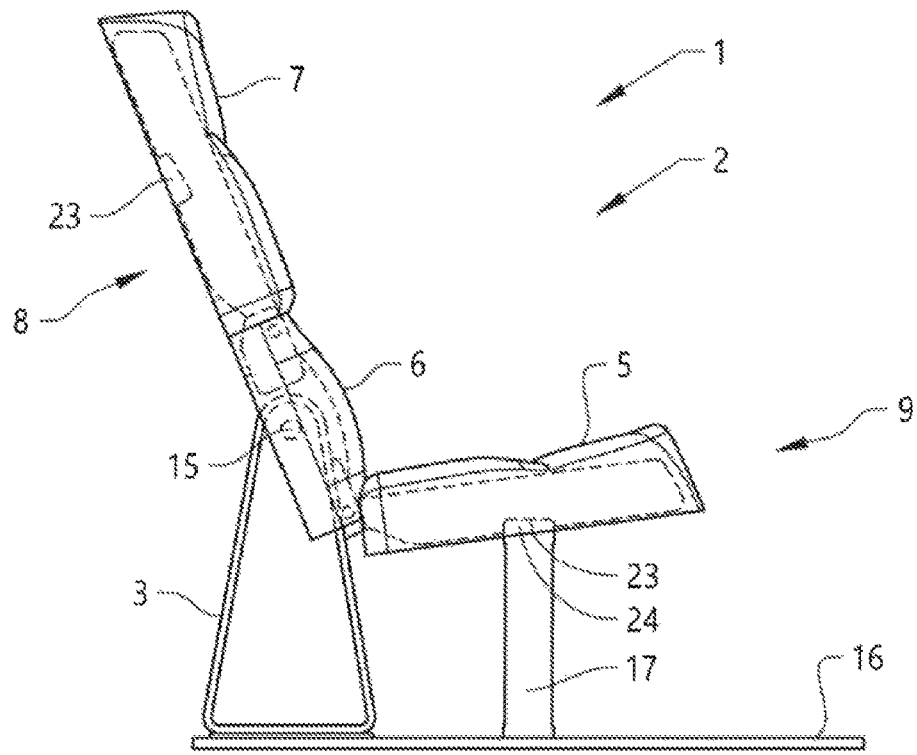

In FIG. 2F, the third seat part 7 has pivoted relative the second seat part 6 and the vehicle seat 2 has been adjusted to the rearward facing setup. In the rearward facing setup, the first seat part 5 is in a seating state and the third seat part 7 is in an upright state. This completes the transition of the vehicle seat 2 from the forward facing setup and a rearward facing setup.

As mentioned above, a headrest can be removably attached to the first seat part 5 and the third seat part 7 such that it can be moved between them depending on if the vehicle seat 2 is in the forward facing setup or the rearward facing setup.

Adjusting the vehicle seat 2 to the forward facing setup can be done by performing the above-described sequence of steps in reverse. It is also possible to pivot the second seat part 6 relative the seat support structure 3 and displacing the seat support structure 3 before pivoting the first and third seat parts 5, 7 if there is enough room inside the vehicle.

As mentioned above, as an alternative no load bearing structure 17 can be used. The adjustment between the forward facing setup and the rearward facing setup is done in the same way as FIGS. 2A-2F.

Although the disclosure has been illustrated and described in detail in the drawings and foregoing description, such illustration and description are to be considered illustrative or exemplary and the disclosure is not limited to the disclosed embodiments. The vehicle seat arrangement 1 of the disclosure can also be used in a vehicle where the vehicle seat 2 faces a direction other than the vehicle's direction of travel and a direction opposite the vehicle's direction of travel. For instance, the vehicle seat 2 can face a direction that is at an angle relative the vehicle's direction of travel. In these cases, forward facing setup and rearward facing setup are to be understood as a first and second facing setup that are arranged essentially 180° relative each other.

What is claimed is:

1. A vehicle seat arrangement comprising:
a vehicle seat that is adjustable between a forward facing setup and a rearward facing setup;
a seat support structure configured to be fastened to a vehicle structure;
wherein the vehicle seat comprises a first seat part, a second seat part and a third seat part, wherein the second seat part is pivotably connected to both the first seat part and the third seat part and is positioned between the first seat part and the third seat part, wherein the second seat part is further pivotably connected to the seat support structure and pivots between the forward facing setup and the rearward facing setup;
wherein, in the forward facing setup, the first seat part and the second seat part make up a seat back of the vehicle seat and the third seat part makes up a seat cushion of the vehicle seat, and wherein, in the rearward facing setup, the first seat part makes up the seat cushion and the second seat part and third seat part make up the seat back of the vehicle seat;
wherein the vehicle seat arrangement further comprises a load bearing structure configured to be fixed to the vehicle structure and to assist in bearing a load from a seated occupant transferred to the load bearing structure via the seat cushion of each of the forward facing setup and the rearward facing setup in which the vehicle seat is positioned; and wherein the load bearing structure comprises an upper portion that engages against the seat cushion of one of the forward facing setup or the rearward facing setup dependent on whether the vehicle seat is positioned in the forward facing setup or the rearward facing setup.

2. The vehicle seat arrangement according to claim 1, wherein the seat support structure displaces horizontally on an adjusting structure in the vehicle structure between a forward seat support structure location and a rearward seat support structure location.

3. The vehicle seat arrangement according to claim 1, wherein the second seat part is symmetric.

4. The vehicle seat arrangement according to claim 1, wherein the second seat part comprises a raised second seat portion arranged to provide lumbar support.

5. The vehicle seat arrangement according to claim 1, wherein the first seat part and the third seat part are identically arranged.

6. The vehicle seat arrangement according to claim 1, wherein the first seat part comprises a raised first seat portion and a depressed first seat portion and the third seat part comprises a raised third seat portion and a depressed third seat portion arranged to provide cervical and thoracic support.

7. The vehicle seat arrangement according to claim 1, wherein the vehicle seat is arranged in the first row of a vehicle.

8. The vehicle seat arrangement according to claim 1, wherein the vehicle seat is arranged in the second row of a vehicle.

9. The vehicle seat arrangement according to claim 1, wherein the vehicle seat is arranged in the third row of a vehicle.

10. A vehicle comprising a vehicle seat arrangement according to claim 1.

11. The vehicle seat arrangement according to claim 2, wherein the vehicle seat is connected to and displaces horizontally with the seat support structure.

12. The vehicle seat arrangement according to claim 11, wherein the seat support structure moves independently of the load bearing structure.

13. The vehicle seat arrangement according to claim 11, wherein the seat support structure displaces horizontally on the adjusting structure laterally outward from the load bearing structure relative to a center of the vehicle seat.

14. The vehicle seat arrangement according to claim 1, wherein the upper portion engages a recess formed in the seat cushion of the forward facing setup or the rearward facing setup in which the vehicle seat is positioned.

* * * * *